United States Patent
Eckstein et al.

(10) Patent No.: US 10,725,831 B2
(45) Date of Patent: Jul. 28, 2020

(54) RESOURCE FEDERATION

(71) Applicant: Hewlett Packard Enterprise Development LP, Houston, TX (US)

(72) Inventors: Denise Marie Eckstein, Palo Alto, CA (US); Roger Kumpf, Cupertino, CA (US); Jonathan M. Sauer, Cupertino, CA (US); Brian D. Harrison, Katy, TX (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 188 days.

(21) Appl. No.: 15/316,299

(22) PCT Filed: Oct. 8, 2014

(86) PCT No.: PCT/US2014/059770
§ 371 (c)(1),
(2) Date: Dec. 5, 2016

(87) PCT Pub. No.: WO2016/057036
PCT Pub. Date: Apr. 14, 2016

(65) Prior Publication Data
US 2017/0206114 A1    Jul. 20, 2017

(51) Int. Cl.
*G06F 9/46* (2006.01)
*G06F 9/50* (2006.01)

(52) U.S. Cl.
CPC .............. *G06F 9/5061* (2013.01); *G06F 9/50* (2013.01); *G06F 2209/503* (2013.01)

(58) Field of Classification Search
None
See application file for complete search history.

(56) References Cited

U.S. PATENT DOCUMENTS

| | | | |
|---|---|---|---|
| 8,042,122 B2 | 10/2011 | Mysore | |
| 8,949,470 B2 * | 2/2015 | Ristock | G06Q 10/10 709/249 |
| 2005/0160143 A1 * | 7/2005 | Bae | G06F 9/5061 709/205 |

(Continued)

FOREIGN PATENT DOCUMENTS

JP    2007531091    11/2007

OTHER PUBLICATIONS

Chen et al., Synchronization in federation community networks, Elsevier Inc., 2009, pp. 144-159.*

(Continued)

*Primary Examiner* — Diem K Cao
(74) *Attorney, Agent, or Firm* — Hewlett Packard Enterprise Patent Department

(57) ABSTRACT

An example system includes one or more resource managers forming a federation of resources, at least one resource manager being associated with one or more resources; a federation hub for receiving local resource information from each of the one or more resource managers, wherein the federation hub aggregates the local resource information from each of the one or more resource managers and provides an aggregated view of all resources of the federation; and a bylaw guardian for determining compliance of each of the one or more resource managers to requirements of the federation.

19 Claims, 5 Drawing Sheets

(56) References Cited

U.S. PATENT DOCUMENTS

| | | | |
|---|---|---|---|
| 2006/0129817 A1* | 6/2006 | Borneman | G06F 21/41 |
| | | | 713/170 |
| 2007/0299946 A1* | 12/2007 | El-Damhougy | H04L 43/0811 |
| | | | 709/223 |
| 2008/0046984 A1* | 2/2008 | Bohmer | H04L 63/0853 |
| | | | 726/5 |
| 2008/0184230 A1 | 7/2008 | Leech | |
| 2009/0055507 A1 | 2/2009 | Oeda | |
| 2010/0106834 A1 | 4/2010 | Isaacson | |
| 2012/0054763 A1 | 3/2012 | Srinivasan | |
| 2012/0226788 A1 | 9/2012 | Jackson | |
| 2013/0073724 A1* | 3/2013 | Parashar | G06F 9/5038 |
| | | | 709/224 |
| 2013/0111478 A1 | 5/2013 | Bieswanger et al. | |
| 2013/0198386 A1* | 8/2013 | Srikanth | G06F 9/5061 |
| | | | 709/226 |
| 2014/0207834 A1* | 7/2014 | Cherian | H04L 67/16 |
| | | | 707/827 |
| 2015/0186228 A1* | 7/2015 | Kumar | G06F 11/2028 |
| | | | 714/4.12 |

OTHER PUBLICATIONS

Had Goudarzi, "Geographical Load Balancing for Online Service Applications in Distributed Datacenters," Aug. 29, 2013, 8 Pgs.
International Searching Authority, The International Search Report and the Written Opinion, PCT/US2014/059770, dated Jun. 29, 2015, 13 Pgs.

* cited by examiner ns. In one example, the resource manager 200 manages the
RESOURCE FEDERATION

BACKGROUND

Computer systems and computer networks include a variety of resources. The resources may include various hardware or software components. The hardware resources may include storage and computing devices, and the software resources may include various applications or services, for example. Each resource may be accessed by a user through a resource manager which may communicate with the resource through a protocol, which may be in accordance with an industry standard. A resource manager may or may not be associated with one or more resources that are available to one or more users.

BRIEF DESCRIPTION OF THE DRAWINGS

For a more complete understanding of various examples, reference is now made to the following descriptions taken in connection with the accompanying drawings in which.

DETAILED DESCRIPTION

Various examples described below provide a resource federation which allows independent resource managers to join together and provide an aggregated view of the resources associated with the independent resource managers. The resource federation is governed according to a set of rules, or bylaws. Various resource managers having associated resources form the resource federation, with at least one resource manager serving as a federation hub and at least one resource manager serving as a bylaw guardian. In some examples, the same resource manager may serve as the federation hub and the bylaw guardian. Thus, the resource federation may be self-governing. In addition, the federation may split into two or more separate federations, each having its own federation hub and bylaw guardian. Conversely, two or more federations may merge into a single federation. The various resources and resource managers may be either co-located in a common location or geographically distributed.

Figure 1:
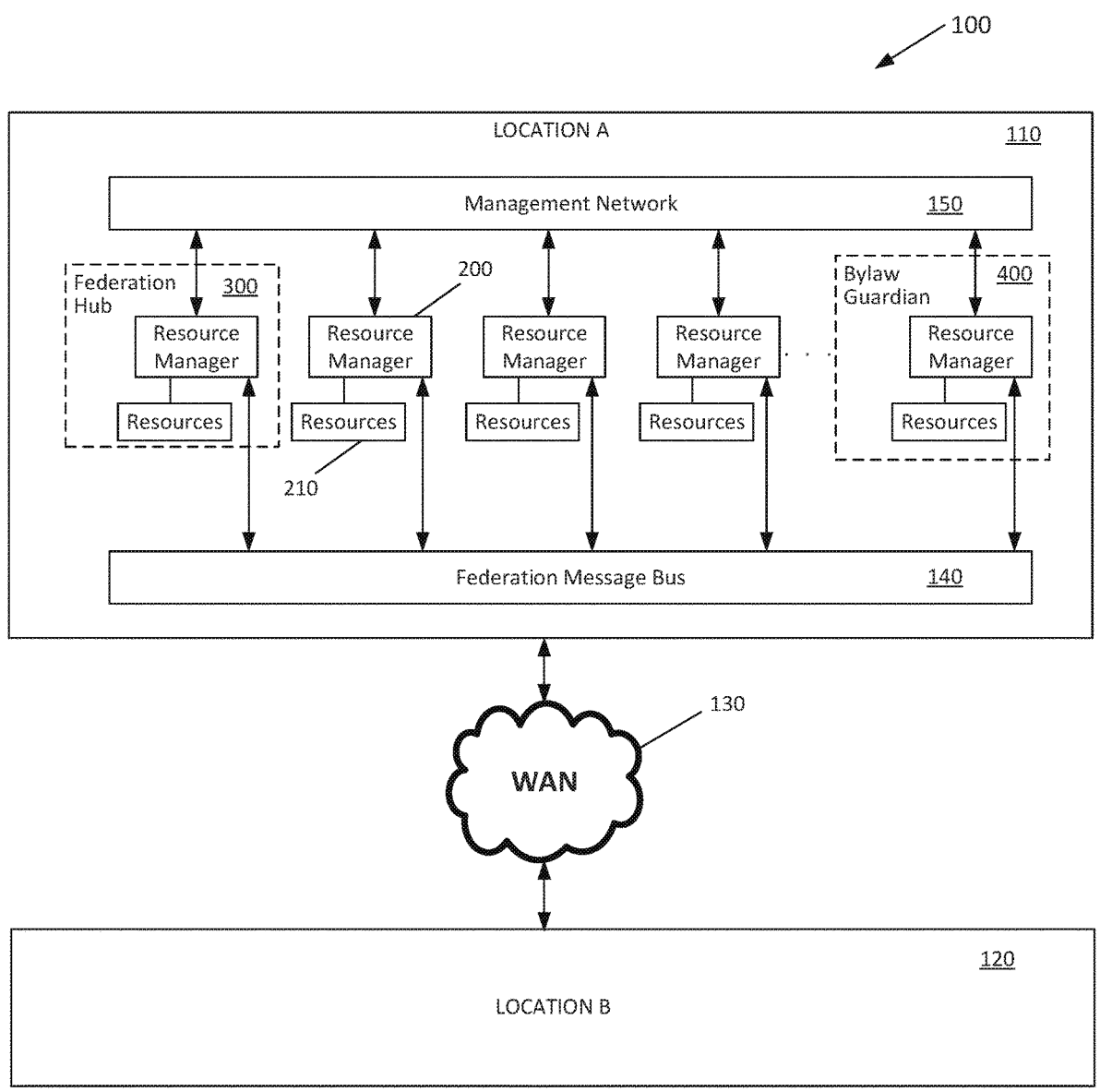
FIG. 1 is a schematic illustration of an example resource federation.

Referring now to FIG. 1, an example resource federation is schematically illustrated. The example resource federation 100 is formed by a plurality of resource managers, such as resource manager 200. The federation 100 may include any number of resource managers 200, each of which may have zero or more resources, such as resources 210, associated with it. The resources 210 included in the federation 100 may include hardware resources and software resources. Hardware resources may include, for example, storage devices to allow users to store information, data servers to allow users to access stored content (e.g., images, videos, music, etc.) and computing devices such as servers. Similarly, software resources may include applications (e.g., web-based applications) or services (e.g., video streaming).

The resource manager 200 may communicate with the one or more associated resources 210 in a variety of manners. In one example, the resource manager 200 manages the resources using standard protocol. For example, when the resource 210 is an internet device, the resource manager 200 may communicate with the resource 210 using the Simple Network Management Protocol (SNMP). Similarly, when the resource 210 is a server or an application, the resource manager 200 may communicate with the resource 210 using the Web Services-Management (WS-Man) standard protocol. In other examples, the resource manager 200 manages the resources 210 using a proprietary or customized solution.

As noted above, in various examples, the resource federation 100 may be geographically distributed. In this regard, the example federation 100 of FIG. 1 includes a portion of the resource federation 100 at a first location (Location A 110) and another portion at a second location (Location B 120). In one example, the different locations 110, 120 may be datacenters in a distributed enterprise system. The resource managers in each of the locations 110, 120 may communicate through a wide-area network (WAN) 130, such as the Internet.

The various resources 210 of the resource federation 100 are aggregated and indexed by a federation hub 300. The role of the federation hub 300 is performed by one of the resource managers in the resource federation. The federation hub 300 receives information from each resource manager 200 in the resource federation 100 related to the resources 210 associated with the resource manager 200. In this regard, the federation hub 300 is able to aggregate and index the resources 210 available to the federation members. In the illustrated example resource federation 100, each resource manager 200 publishes index information for its local resources on the federation message bus. The federation hub 300 consumes information on the federation message bus to create an aggregated index. An example operation of the federation hub is described below with reference to FIG. 3.

The resource federation 100 is defined and governed by a set of rules, or bylaws. In various examples, the bylaws are encoded as a set of rules that can be used to ensure that all resource managers are compliant with the requirements (e.g., the bylaws) of the federation 100. Bylaws may regulate a wide range of federation behaviors. For example, the bylaws may explicitly list the resource managers that may participate in the federation. In other examples, the bylaws may define service level objectives that a member should satisfy. Bylaws may ensure that a resource manager is capable of participating in the federation by, for example, running a compatible version of software or type of authentication service. In other examples, the bylaws may include requirements associated with installed software packages, configuration settings, available capacity, performance characteristics, connectivity, and availability and/or disaster recovery capabilities.

The bylaws are maintained and enforced by a bylaw guardian 400, which is a trusted member of the federation and may also be responsible for management of the federation. In this regard, the bylaw guardian 400 maintains the definition of the bylaws, ensures compliance with the bylaws by the federation members and approves membership of the federation. The bylaw guardian 400 may also manage various roles served by the resource managers 200 of the federation 100. The role of the bylaw guardian 400 is performed by one of the resource managers of the resource federation. In the illustrated example resource federation 100, the bylaw guardian 400 uses a management network 150 to interact with each resource manager 200 to ensure compliance and to perform federation management functions. Those skilled in the art will appreciate that, in various examples, the federation hub 300 may perform the management functions, while the bylaw guardian may be responsible for authorizing operations on the resource federation 100. An example operation of the bylaw guardian 400 is described below with reference to FIG. 4.

In the illustrated example of FIG. 1, the resource federation 100 includes a single resource manager serving the role of a federation hub 300 and a single resource manager serving the role of a bylaw guardian 400. Other example resource federations may have multiple federation hubs 300 and/or multiple bylaw guardians 400, potentially with each member of the federation participating as both a federation hub 300 and a bylaw guardian 400. For example, in the example federation 100 of FIG. 1, a federation hub 300 may be assigned in each location 110, 120. Similarly, a bylaw guardian 400 may be assigned in each location 110, 120. Thus, in the event of a network breakdown that may isolate the locations 110, 120 from each other, the resource managers in each location may continue functioning as a separate federation. In this regard, the federation hub 300 and the bylaw guardian 400 in Location A 110 may allow the resources 210 and the resource managers 200 at Location A 110 to continue operating as one federation. At the same time, a federation hub and a bylaw guardian in Location B 120 may allow the resources and the resource managers at Location B 120 to continue operating as another federation with identical bylaws.

Figure 2:
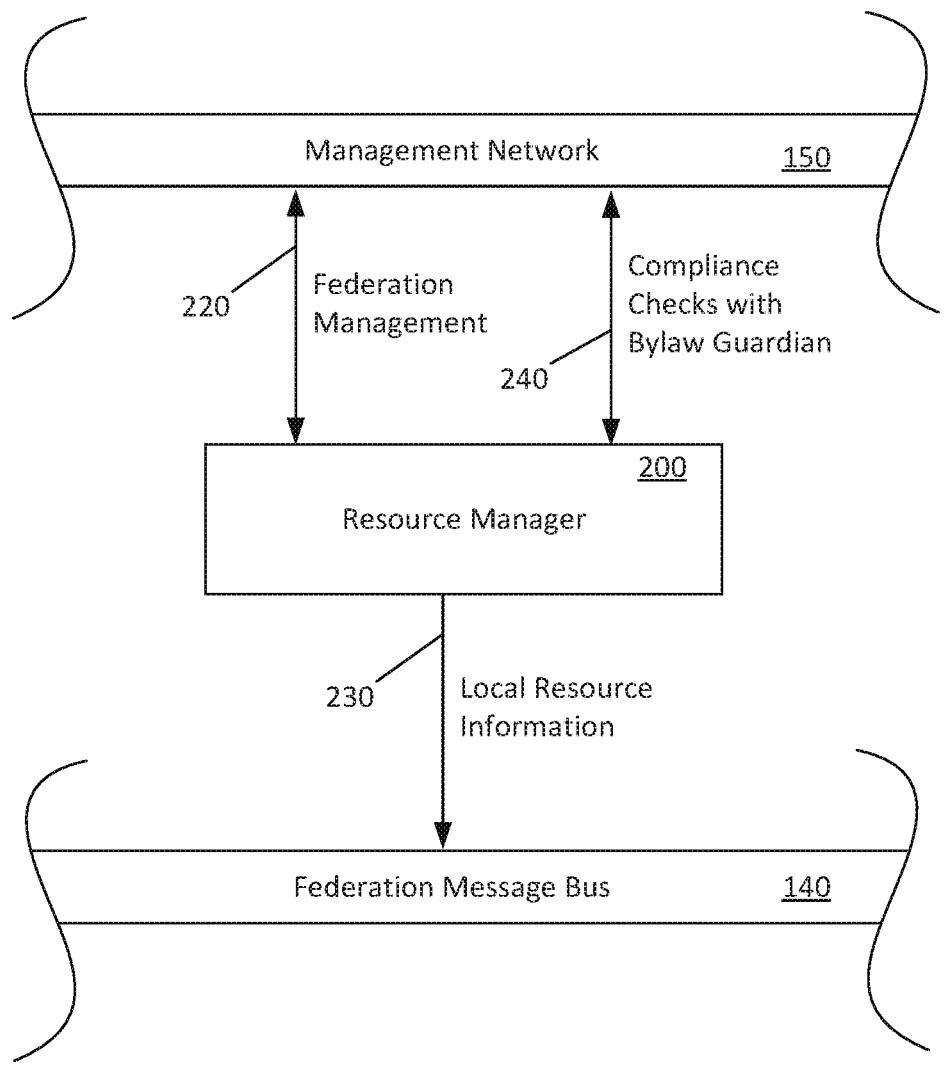
FIG. 2 schematically illustrates operation of an example resource manager in a federation.

Referring now to FIG. 2, operation of an example resource manager in a federation is schematically illustrated. The resource manager 200 may include various resources 210 (not shown in FIG. 2) that may be accessible by other members of the federation 100. The resource manager 200 interacts with various other members of the federation 100. For example, the resource manager 200 can interact with the federation hub 300 through the federation message bus 140 and with the bylaw guardian 400 through the management network 150.

With regard to the federation hub 300, the resource manager 200 provides information related to resources 210 associated with the resource manager 200 to the federation hub 300 through the federation message bus 140, as illustrated by the arrow 230. This local resource information from the resource manager 200 is used by the federation hub 300 to generate aggregated resource information for the entire federation 100. In this regard, the federation hub 300 receives local resource information from each resource manager 200 in the federation 100. The resource information may include various parameters, such as identification of the resource and its capabilities, for example.

With regard to the bylaw guardian 400, the resource manager 200 may interact with the bylaw guardian 400 through the management network 150. The interaction between the resource manager 200 and the bylaw guardian 400 may include federation management operations, as indicated by the arrow 220 in FIG. 2. The federation management operations may include assignment of various roles to the resource manager 200. For example, assigning of a resource manager as a federation hub or a bylaw guardian may be performed through the management network 150. The management operations may be initiated by the bylaw guardian 400 or by the resource manager 200. For example, the bylaw guardian 400 may determine that the role of federation hub 300 may be performed by another resource manager that has more bandwidth than the current federation hub 300 and may, accordingly, initiate the re-assigning of that role. In another example, a resource manager 200 may submit a request to the bylaw guardian to either add or remove itself from the role of a federation hub or a bylaw guardian.

The resource manager 200 may also interact with the bylaw guardian 400 through the management network 150 to ensure that the resource manager 200 is in compliance with the requirements of the federation (e.g., compliant with the bylaws), as indicated by the arrow 240 in FIG. 2. In this regard, the bylaw guardian 400 may periodically request information related to resource managers 200. The bylaw guardian 400 may compare the information related to resource managers with the federation requirements. When the resource managers are in compliance with the federation requirements, the resource manager may continue to be included in the federation. When the resource managers are not in compliance with the federation requirements, the bylaw guardian 400 may reconfigure or exclude a resource manager from the federation.

Figure 3:
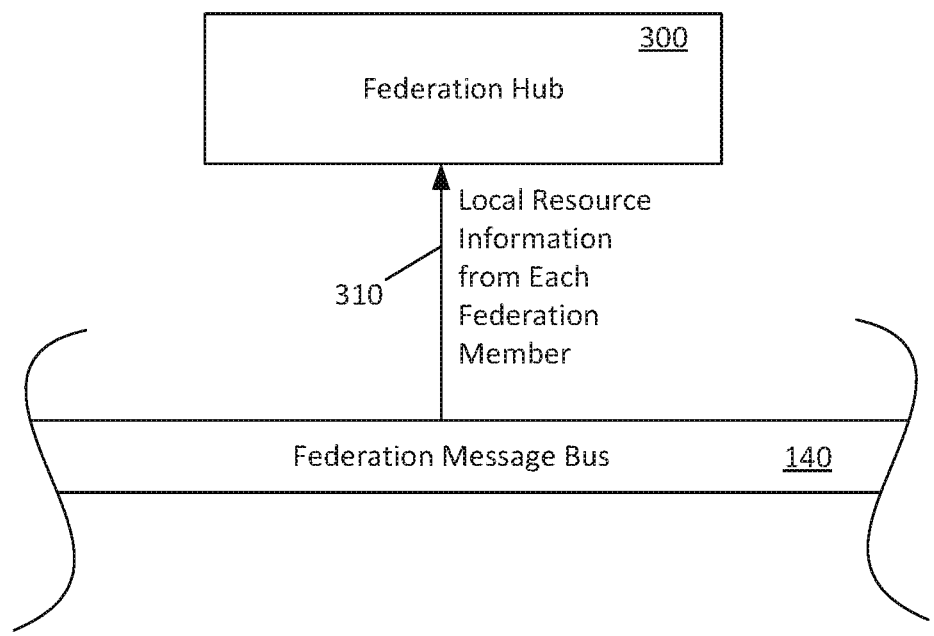
FIG. 3 schematically illustrates operation of an example federation hub in a federation.

Referring now to FIG. 3, operation of an example federation hub 300 in a federation is schematically illustrated. The federation hub 300 interacts with various other members of the federation 100 (e.g., resource manager 200) through the federation message bus 140. As noted above, the federation hub 300 interacts with each resource manager 200 of the federation. For example, the federation hub 300 receives information related to resources 210 associated with various resource managers 200 through the federation message bus 140, as illustrated by the arrow 310. The federation hub 300 uses the received local resource information to generate aggregated resource information for the entire federation 100.

As noted above, in various examples, the role of the federation hub 300 is performed by one or more of the resource managers of the federation. In this regard, those skilled in the art will understand that, while FIG. 3 illustrates the federation hub 300 communicating with the federation message bus 140, the resource manager serving as the federation hub also acts as the resource manager, as described above with reference to FIG. 2.

Figure 4:
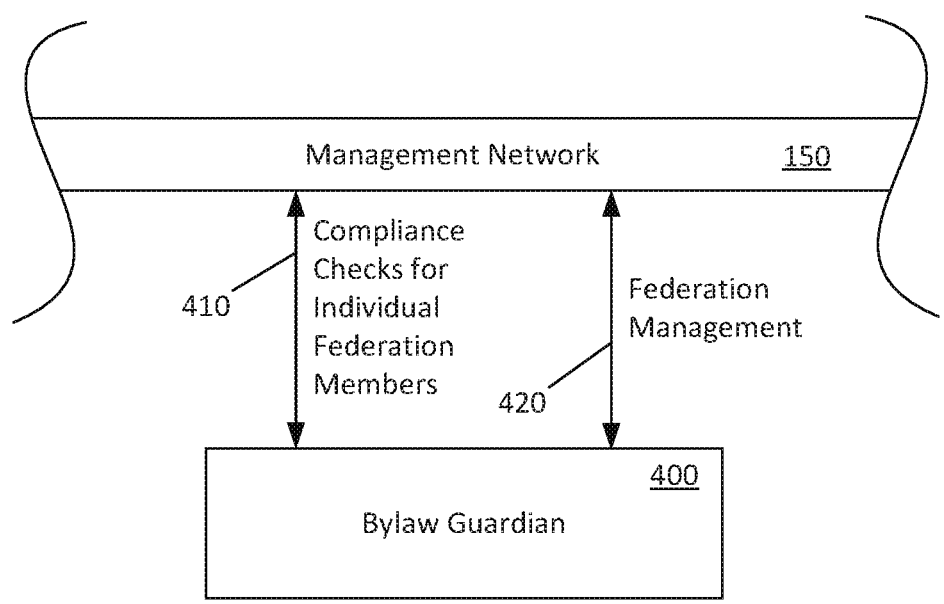
FIG. 4 schematically illustrates operation of an example bylaw guardian in a federation.

Referring now to FIG. 4, operation of an example bylaw guardian 400 in a federation 100 is schematically illustrated. The bylaw guardian 400 and the various resource managers 200 can interact with each other through the management network 150. As noted above, the interaction between the resource manager 200 and the bylaw guardian 400 may include compliance checks, as indicated by the arrow 410 of FIG. 4, and federation management operations, as indicated by the arrow 420 in FIG. 4. The federation management operations may include assignment of various roles to various resource manager 200.

With regard to compliance checks, as described above with reference to FIG. 2, the bylaw guardian 400 may compare information related to a resource manager with the federation requirements or bylaws. Based on this comparison, compliant resource managers may be included in the federation, and non-compliant resource managers may be excluded from the federation. The compliance checks may be performed periodically on existing members of the federation to detect resource managers that may have become non-compliant. In various examples, similar compliance checks may be used to grant or deny federation membership to new resource managers. For example, a new resource manager may be granted federation membership only if the resource manager is determined to be in compliance with the federation bylaws. When a resource manager joins a federation, the resource manager retains ownership of the management of resources associated with the resource manager. Operations on remote resources initiated from a federation hub are automatically routed to the owning resource manager for processing.

Figure 5:
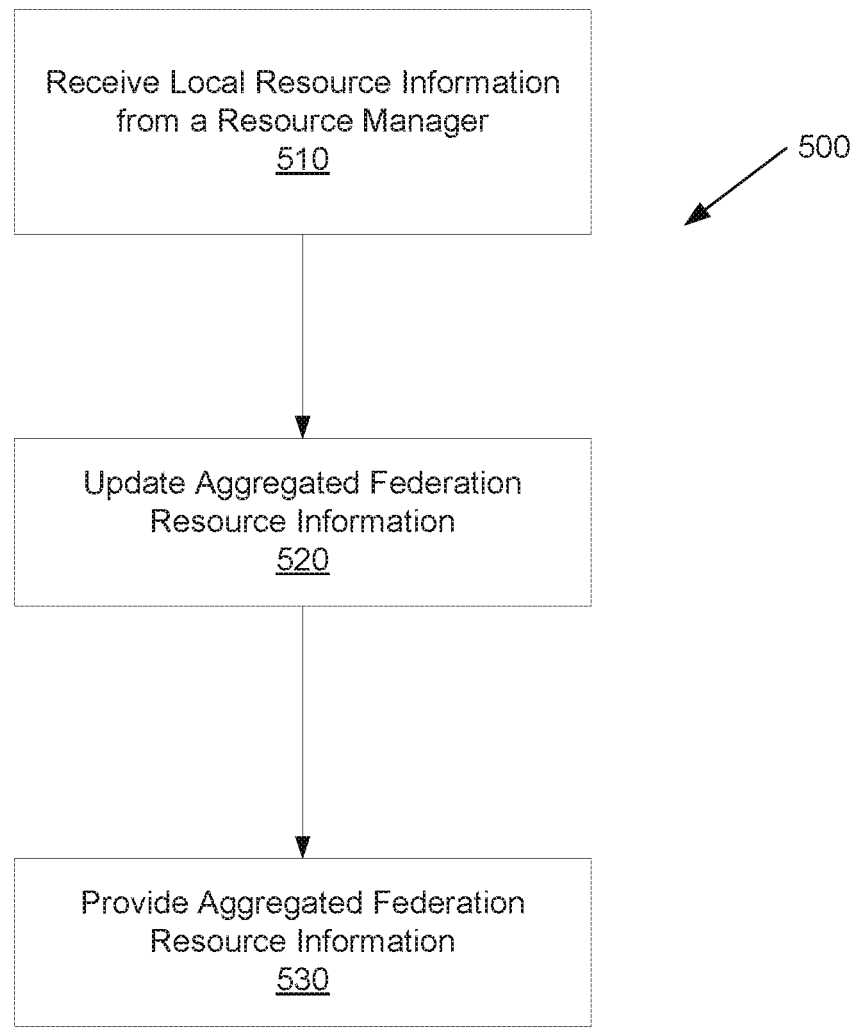
FIG. 5 illustrates an example method for providing federation resource information.

Referring now to FIG. 5, an example method for providing federation resource information is illustrated. In accordance with the various examples described herein, the method 500 of FIG. 5 may be performed by a federation hub 300 of the federation 100. The method 500 includes receiving local resource information from the various resource managers of the federation (block 510). As described above, the local resource information may include various parameters related to the resources associated with each resource manager, such as the identity of the resource and its capabilities, for example. The federation hub may then update (or generate) aggregated federation resource information for the entire federation (block 520). In this regard, in various examples, the federation hub may generate a global (federation-wide) index of the resources. The federation hub may then provide or otherwise make available the aggregated federation resource information to, for example, infrastructure administrators and management applications (block 530). In this regard, administrators or management applications may use a federation hub to access and manage any resource in the aggregated view, for example.

Figure 6:
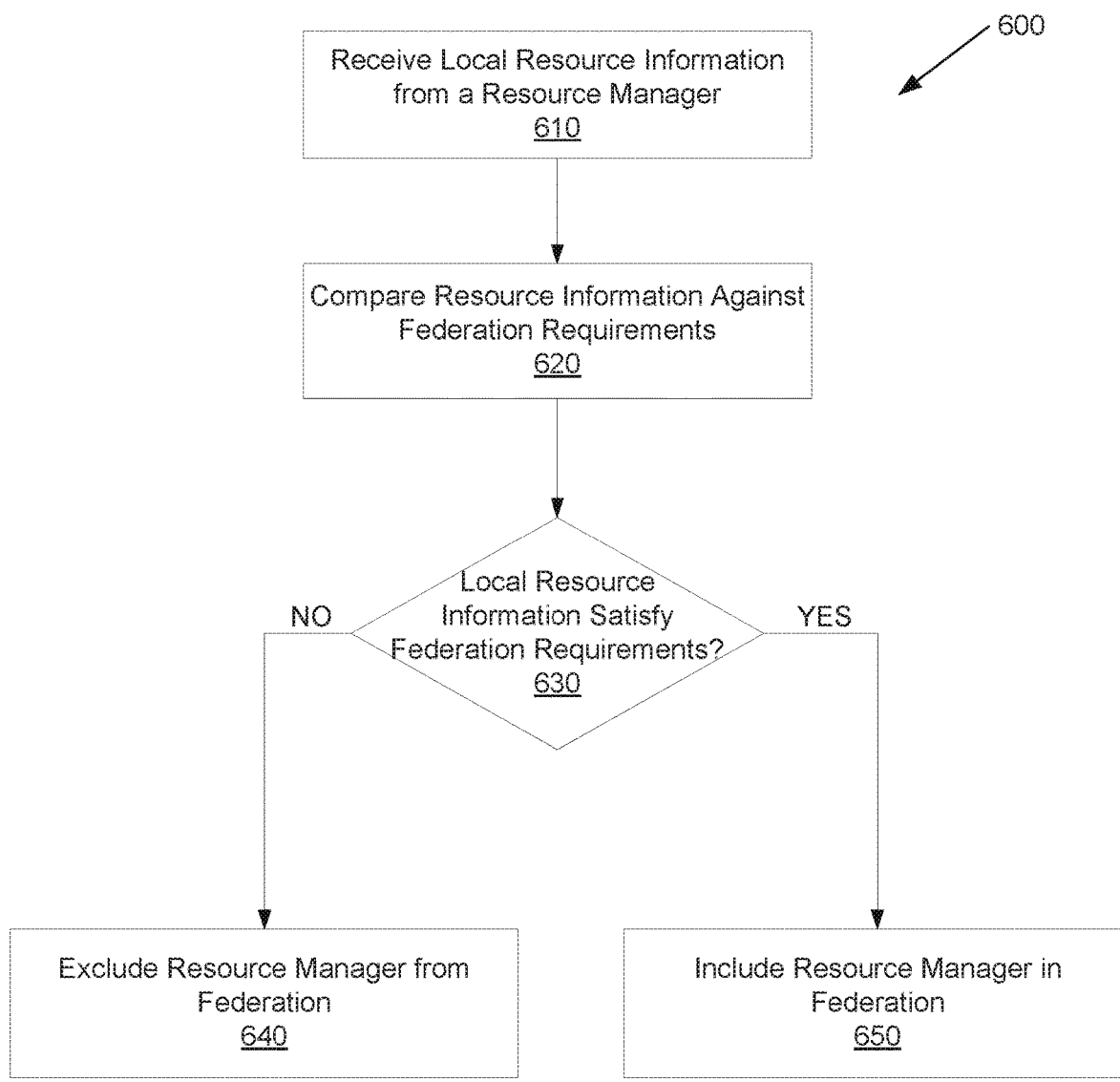
FIG. 6 illustrates an example method for including or excluding a resource manager in a federation.

Referring now to FIG. 6, an example method for including or excluding a resource manager in a federation is illustrated. In accordance with the various examples described herein, the method 600 of FIG. 6 may be performed by a bylaw guardian 400 of the federation 100. The method 600 includes receiving local resource information from a resource manager of the federation (block 610). In some examples, the local resource information may be delivered pursuant to a compliance check message to an existing resource manager from the bylaw guardian. In other examples, the local resource information may be delivered pursuant to a request from the resource manager to join the federation.

Upon receiving the local resource information, the bylaw guardian compares the local resource information against requirements of the federation, such as the bylaws of the federation (block 620). The bylaw guardian may then determine whether the local resource information is compliant with the requirements of the federation and satisfies all federation requirements (block 630). If the local resource information is not compliant with the requirements of the federation, the resource manager may be excluded from the federation (block 640). If the resource manager is new (e.g., requesting membership in the federation), membership may be denied. If the resource manager is an existing member, the resource manager may be evicted from the federation or required to participate in a reduced capacity (e.g., in a resource owner only role).

If the local resource information is compliant with the requirements of the federation, the resource manager is included in the federation (block 650). If the resource manager is new (e.g., requesting membership in the federation), membership may be granted. If resource manager is an existing member, the resource manager may be retained in the federation.

As described above with regard to FIG. 1, a single resource federation 100 may split into two separate federations, such as one federation at Location A 110 and another federation at Location B 120. Each federation has its own federation hub(s) and bylaw guardian(s). In a similar manner, multiple federations may merge to form a single federation. For example, the federation 100 may receive a merge request from a second federation. Specifically, the bylaw guardian 400 of the first federation 100 may receive a request from a bylaw guardian of the second federation. For the merger to proceed, the bylaw guardian of one or both federations may compare the bylaws of the two federations. The merge request may be granted when the two sets of bylaws are compatible; allowing the merged federation to operate under the combined set of bylaws. In this regard, in some examples, the bylaws may be deemed compatible only if they are identical. When the two sets of bylaws are not compatible, the merge request may be denied.

Thus, various examples described herein provide an efficient federation of resources. In various examples, responsibility for managing the federation is shared across members (e.g., the various resource managers) through various defined roles. A federation member may, with approval from the federation, dynamically assume or discard one or more federation roles, such as a federation hub or a bylaw guardian. In various examples, the bylaws may define the rules to accept or revoke assignment of roles (e.g., federation hub and/or bylaw guardian), as well as control membership of the federation and control number of members in each role.

The ability of resource managers to dynamically assume or discard the various federation roles provides the flexibility to design federated solutions that scale and increase availability. Thus, the cost of managing the federation across resource managers may take advantage of extra capacity available on a resource manager and reduces the dedicated infrastructure required to manage the federation.

Various examples described herein are described in the general context of method steps or processes, which may be implemented in one example by a software program product or component, embodied in a machine-readable medium, including executable instructions, such as program code, executed by entities in networked environments. Generally, program modules may include routines, programs, objects, components, data structures, etc. which may be designed to perform particular tasks or implement particular abstract data types. Executable instructions, associated data structures, and program modules represent examples of program code for executing steps of the methods disclosed herein. The particular sequence of such executable instructions or associated data structures represents examples of corresponding acts for implementing the functions described in such steps or processes.

The various examples set forth herein are described in terms of example block diagrams, flow charts and other illustrations. Those skilled in the art will appreciate that the illustrated examples and their various alternatives can be implemented without confinement to the illustrated examples. For example, block diagrams and their accompanying description should not be construed as mandating a particular architecture or configuration.

What is claimed is:
1. A system, comprising:
   a plurality of resource managers forming a federation of resources, at least one resource manager being associated with one or more resources;
   a federation hub, comprising a first of the plurality of resource managers, for receiving local resource information from each of the one or more resource managers, wherein the federation hub aggregates the local resource information from each of the one or more resource managers and provides an aggregated view of all resources of the federation; and a bylaw guardian, comprising at least one of the plurality of resource managers, to:
- determine compliance of each of the plurality of resource managers to requirements of the federation;
- receive a request from the first resource manager to assign the particular resource manager to serve as the federation hub; and
- assign the first resource manager to serve as the federation hub in response to receipt of at least one of a role reassignment request from the federation hub and the request from the particular resource manager, wherein the bylaw guardian includes resource managers satisfying requirements of the federation into the federation and excludes resource managers violating requirements of the federation from the federation.

2. The system of claim 1, further comprising a federation bus coupled to facilitate communication between the plurality of resource managers.

3. The system of claim 1, wherein the bylaw guardian comprises the first resource manager.

4. The system of claim 1, wherein the bylaw guardian allows merger with a second federation by confirming requirements of the second federation are in compliance with the requirements of the federation.

5. The system of claim 1, wherein the bylaw guardian is for:
- receiving a merge request from a second bylaw guardian of a second resource federation; and
- granting the merge request in response to a determination that the requirements of the resource federation and the requirements of the second resource federation are compatible.

6. The system of claim 1, wherein the bylaw guardian is for:
- receiving a merge request from a second bylaw guardian of a second resource federation; and
- declining the merge request in response to a determination that the requirements of the resource federation and the requirements of the second resource federation are not compatible.

7. The system of claim 1, wherein the bylaw guardian is for:
- receiving a merge request from a second bylaw guardian of a second resource federation; and
- comparing the requirements of the resource federation with requirements of the second resource federation.

8. A method, comprising:
- receiving local resource information from a resource manager;
- comparing the local resource information from the resource manager to requirements of a resource federation;
- including the resource manager in the resource federation when the local resource information complies with the requirements of the resource federation;
- excluding, or modifying participation level of, the resource manager from the resource federation when the local resource information does not comply with the requirements of the resource federation
- wherein the resource manager is set as a federation hub for the resource federation;
- receiving a request from the resource manager to remove the resource manager from the resource federation; and
- assigning a new resource manager to manage the resource federation as a new federation hub in response to receipt of the request to remove the resource manager from the resource federation.

9. The method of claim 8, wherein the requirements of the resource federation include installed software packages, configuration settings, available capacity, performance characteristics, connectivity, and availability and/or disaster recovery capabilities.

10. The method of claim 8, wherein the receiving the local resource information from the resource manager and comparing are performed by a bylaw guardian of the resource federation.

11. The method of claim 10, wherein the bylaw guardian is a resource manager.

12. The method of claim 10, further comprising:
- receiving a merge request from a second bylaw guardian of a second resource federation;
- comparing the requirements of the resource federation with requirements of the second resource federation;
- granting the merge request when the requirements of the resource federation and the requirements of the second resource federation are compatible; and
- declining the merge request when the requirements of the resource federation and the requirements of the second resource federation are not compatible.

13. The method of claim 12, wherein the merge request is granted when the requirements of the resource federation and the requirements of the second resource federation are compatible.

14. The method of claim 8, wherein the including, excluding, and assigning are performed by a bylaw guardian of the resource federation.

15. A computer program product, embodied on a non-transitory computer-readable medium comprising instructions and executable by a processing resource to cause a network environment to:
- receive local resource information from a first resource manager;
- compare the local resource information from the first resource manager to requirements of a resource federation;
- include the first resource manager in the resource federation when the local resource information complies with the requirements of the resource federation;
- exclude the first resource manager from the resource federation when the local resource information does not comply with the requirements of the resource federation or in response to a request generated by the first resource manager to remove the first resource manager from the resource federation,
- wherein the resource manager is set as a federation hub for the resource federation;
- receive a request from the resource manager to remove the resource manager from the resource federation; and
- assign a new resource manager to manage the resource federation as a new federation hub in response to receipt of the request to remove the resource manager from the resource federation.

16. The computer program product of claim 15, wherein the instructions to receive the local resource information and compare the local resource information form the first resource manager to requirements of the resource federation are executed by a bylaw guardian of the resource federation.

17. The computer program product of claim 15, wherein the instructions are further executable to cause the network environment to:
- receive a merge request from a second bylaw guardian of a second resource federation;

compare the requirements of the resource federation with requirements of the second resource federation;

grant the merge request when the requirements of the resource federation and the requirements of the second resource federation are compatible; and decline the merge request when the requirements of the resource federation and the requirements of the second resource federation are not compatible.

18. The computer program product of claim 17, wherein the merge request is granted when the requirements of the resource federation and the requirements of the second resource federation are compatible.

19. The computer program product of claim 15, wherein the instructions to include, exclude, and assign are executed by a bylaw guardian of the resource federation.

\* \* \* \* \*